United States Patent
Hsiao et al.

(10) Patent No.: US 7,881,019 B2
(45) Date of Patent: Feb. 1, 2011

(54) TWO STEP CORNER RECESS FOR SECONDARY STRAY FIELD REDUCTION IN A PERPENDICULAR MAGNETIC RECORDING HEAD

(75) Inventors: Wen-Chien David Hsiao, San Jose, CA (US); Yimin Hsu, Sunnyvale, CA (US); Ming Jiang, San Jose, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 717 days.

(21) Appl. No.: 11/391,835

(22) Filed: Mar. 28, 2006

(65) Prior Publication Data

US 2007/0230045 A1 Oct. 4, 2007

(51) Int. Cl.
*G11B 5/33* (2006.01)
*G11B 5/127* (2006.01)

(52) U.S. Cl. ............ 360/319; 360/125.03; 360/125.14; 360/125.3; 360/125.2; 360/125.52; 360/125.65

(58) Field of Classification Search ................. 360/317, 360/319, 122, 125.01–125.75
See application file for complete search history.

(56) References Cited

U.S. PATENT DOCUMENTS

| | | | | |
|---|---|---|---|---|
| 4,921,508 A * | 5/1990 | Nonaka | ................... | 29/603.15 |
| 5,801,910 A * | 9/1998 | Mallary | ................ | 360/125.65 |
| 5,995,343 A | 11/1999 | Imamura | ................... | 360/126 |
| 6,122,144 A * | 9/2000 | Chang et al. | ............... | 360/122 |
| 6,330,127 B1 * | 12/2001 | Sasaki | .................. | 360/125.65 |
| 6,459,543 B1 | 10/2002 | Sasaki | ...................... | 360/126 |
| 6,504,675 B1 | 1/2003 | Shukh et al. | ............... | 360/125 |
| 6,525,904 B1 * | 2/2003 | Sasaki | ................... | 360/125.65 |
| 6,742,241 B1 | 6/2004 | Sasaki | .................... | 29/603.07 |
| 6,768,611 B2 * | 7/2004 | Sato et al. | ............. | 360/125.44 |
| 6,775,099 B2 * | 8/2004 | Kuroda et al. | ......... | 360/125.06 |

(Continued)

FOREIGN PATENT DOCUMENTS

JP   57162112 A   * 10/1982

(Continued)

OTHER PUBLICATIONS

Chinese Office Action Summary from application No. 2007/10091431.3 issued on Sep. 12, 2008.

*Primary Examiner*—William J Klimowicz
(74) *Attorney, Agent, or Firm*—Zilka-Kotab, PC (57) ABSTRACT

A magnetic structure for use in a magnetic head for avoiding stray field writing. The magnetic structure can be for example a magnetic shield or could be a magnetic pole of a write head and is particularly advantageous for use in a perpendicular recording system, because such perpendicular recording systems are especially susceptible to stray field writing. The magnetic structure includes a forward protruding portion that extends toward the air bearing surface (ABS) of the head also includes first and second wing portions that extend laterally from the forward protruding portion. The wing portions each have includes an inner constant recess portion, and an outer tapered portion. The inner constant recess portion of each wing prevents stray field writing while also preventing magnetic saturation, the outer tapered portions, which taper away from the ABS as they extend laterally outward, further prevent stray field writing by removing the outer corners of the shield away from the ABS.

10 Claims, 7 Drawing Sheets

U.S. PATENT DOCUMENTS

| | | | |
|---|---|---|---|
| 6,822,832 B2 * | 11/2004 | Shinjo | 360/125.56 |
| 6,826,012 B1 * | 11/2004 | Sasaki | 360/125.42 |
| 6,876,519 B1 | 4/2005 | Litvinov et al. | 360/125 |
| 7,113,366 B1 * | 9/2006 | Wang et al. | 360/125.46 |
| 7,116,517 B1 * | 10/2006 | He et al. | 360/125.56 |
| 7,328,499 B2 * | 2/2008 | Matono et al. | 29/603.16 |
| 2002/0026704 A1 | 3/2002 | Stageberg et al. | 29/603.12 |
| 2005/0068678 A1 | 3/2005 | Hsu et al. | 360/126 |

FOREIGN PATENT DOCUMENTS

JP        01184611 A  *  7/1989

* cited by examiner

TWO STEP CORNER RECESS FOR SECONDARY STRAY FIELD REDUCTION IN A PERPENDICULAR MAGNETIC RECORDING HEAD

FIELD OF THE INVENTION

The present invention relates to current perpendicular to plane magnetic recording and more particularly to novel magnetic trailing shield design to avoid adjacent track interference and more particularly to avoid wide angle track erasure (WATER) while also avoiding excessive magnetic flux in a center region of the trailing shield.

BACKGROUND OF THE INVENTION

The present invention is related to and hereby incorporates by reference the following commonly assigned patent applications which are hereby incorporated by reference: NOTCHED SHIELD AND POLE STRUCTURE WITH SLANTED WING FOR PERPENDICULAR RECORDING, application Ser. No. 10/976,479, filed Oct. 29, 2004, now U.S. Pat. No. 7,764,469; WINGED DESIGN FOR REDUCING CORNER STRAY MAGNETIC FIELDS, application Ser. No. 10/977,315, filed Oct. 29, 2004; now U.S. Pat. No. 7,616,403; WINGED POLE AND SHIELD STRUCTURE FOR REDUCING STRAY FIELD IN A PERPENDICULAR WRITE HEAD, application Ser. No. 10/976,478, Oct. 29, 2004, now U.S. Pat. No. 7,508,628; and DOUBLE NOTCHED SHIEILD AND POLE STRUCTURE FOR STRAY FIELD REDUCTION IN A MAGNETIC HEAD, application Ser. No. 10/977,446, filed Oct. 29, 2004, now U.S. Pat. No. 7,649,711.

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetization oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Perpendicular storage systems facilitate greater storage density than do longitudinal systems. Although a more detailed discussion of a perpendicular recording system in which the present invention may be embodied is present in the following Detailed Description of the Invention, a more focused discussion of a challenge presented by such perpendicular recording systems is presented here with reference to FIG. 1, in which a magnetic structure 102, which could be for example a magnetic shield, magnetic pole or some other magnetic structure is shown along with its relationship to a magnetic medium 112.

Figure 1:
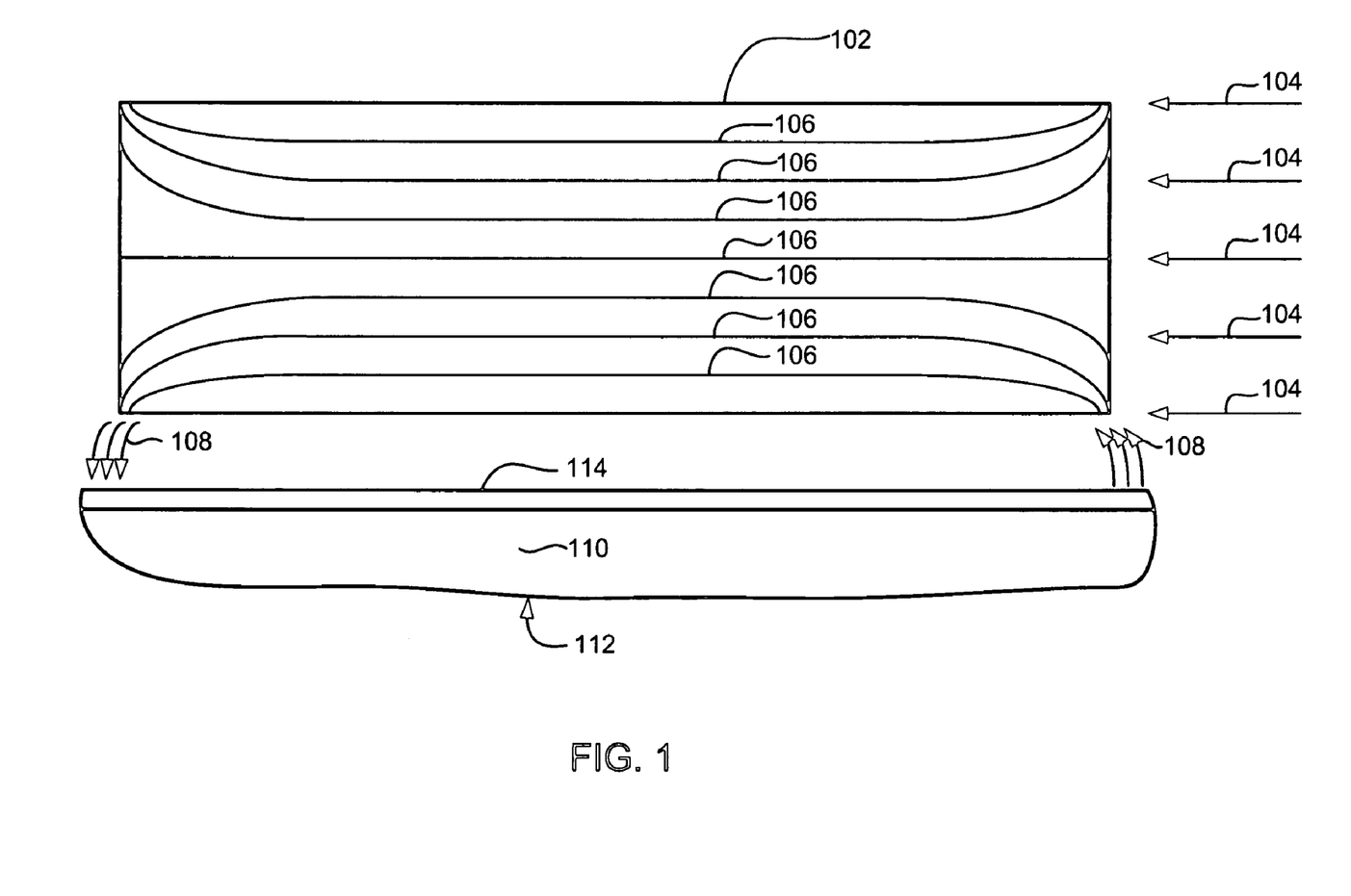
FIG. 1 is a view of a magnetic structure illustrating the effect of an environmental magnetic field on the magnetic structure and adjacent magnetic medium.

The magnetic medium 112 of a perpendicular recording system creates problems with regard to data erasure that are not generally encountered with longitudinal recording systems. The magnetic medium 112 includes a thin magnetically hard top layer 114 and a low coercivity underlayer 110. Because of its low coercivity and relatively large size, the soft underlayer is extremely susceptible to being affected by magnetic fields.

With reference still to FIG. 1, when a longitudinal external field 104 is applied, the soft underlayer 110 accentuates the collection of magnetic charges in the corners of magnetic structures 102 of the recording head which are exposed at the air bearing surface (ABS) of the head, as indicated by lines 106. This can result in unwanted stray magnetic fields 108 collecting in the corners of the magnetic structure, which can potentially erase stored data from the recording medium 158. It should be pointed out that, while the flux 106 is being described as resulting from a longitudinal field, a similar result would occur from the presence of a vertical field, or a field canted at some other angle therebetween.

Although magnetic structures such as magnetic shields and magnetic poles exhibit the problem described above, such magnetic structures are a necessary part of magnetic recording heads and cannot simply be eliminated. Therefore, there is a strong felt need for a design for magnetic structures that can allow efficient performance of the magnetic structure for its intended purpose (such as a magnetic shield) while avoiding such unwanted stray field writing. Such a solution to the above problem would preferably not involve the addition of significant processes complexity and would allow the use of currently available desired magnetic materials.

SUMMARY OF THE INVENTION

The present invention provides a magnetic structure for use in a magnetic head configured to prevent stray field writing in an adjacent magnetic medium. The magnetic structure has a centrally disposed, forward protruding portion that extends toward the air bearing surface (ABS) of the head. First and second wing shaped portions extend from the centeral, forward protruding portion. Each wing portion has an inner portion and an outer portion. The inner wing portion has a front edge that is recessed from the ABS by a recess distance that is substantially constant, and the outer wing portion is tapered so that its front edge is recessed from the ABS by an amount that increases with increasing lateral distance from the center of the structure.

The recess of the wing portions advantageously prevents stray field, writing. The constant recess of the inner wing portion advantageously prevents magnetic saturation near the center of the structure, while the backward taper (increasing recess) of the outer portion provides added protection against stray field writing by moving the outer corners of the structure away from the ABS.

The inner wing portion can have a recess from the ABS of 0.6-0.9 um or about 0.75 um and the outermost portion of the wing can have a maximum recess that is 2-4 times the recess of the inner wing portion, or about 3 times the recess of the inner portion.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 2:
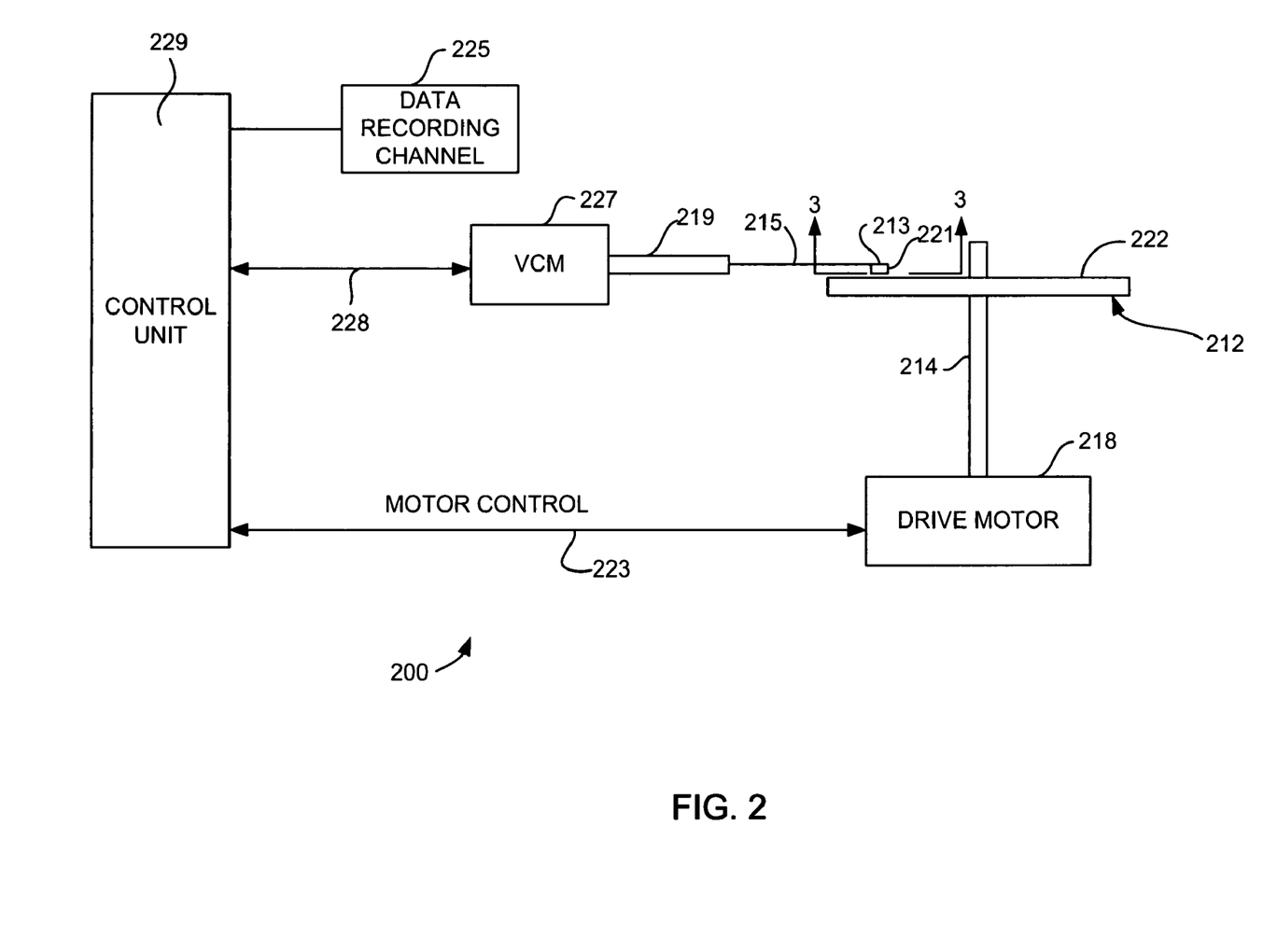
FIG. 2 is a schematic illustration of a disk drive system in which the invention might be embodied.

Referring now to FIG. 2, there is shown a disk drive 200 embodying this invention. As shown in FIG. 2, at least one rotatable magnetic disk 212 is supported on a spindle 214 and rotated by a disk drive motor 218. The magnetic recording on each disk is in the form of annular patterns of concentric data tracks (not shown) on the magnetic disk 212.

At least one slider 213 is positioned near the magnetic disk 212, each slider 213 supporting one or more magnetic head assemblies 221. As the magnetic disk rotates, slider 213 moves radially in and out over the disk surface 222 so that the magnetic head assembly 221 may access different tracks of the magnetic disk where desired data are written. Each slider 213 is attached to an actuator arm 219 by way of a suspension 215. The suspension 215 provides a slight spring force which biases slider 213 against the disk surface 222. Each actuator arm 219 is attached to an actuator means 227. The actuator means 227 as shown in FIG. 2 may be a voice coil motor (VCM). The VCM comprises a coil movable within a fixed magnetic field, the direction and speed of the coil movements being controlled by the motor current signals supplied by controller 229.

During operation of the disk storage system, the rotation of the magnetic disk 212 generates an air bearing between the slider 213 and the disk surface 222 which exerts an upward force or lift on the slider. The air bearing thus counter-balances the slight spring force of suspension 215 and supports slider 213 off and slightly above the disk surface by a small, substantially constant spacing during normal operation.

The various components of the disk storage system are controlled in operation by control signals generated by control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 213 to the desired data track on disk 212. Write and read signals are communicated to and from write and read heads 221 by way of recording channel 225.

Figure 3:
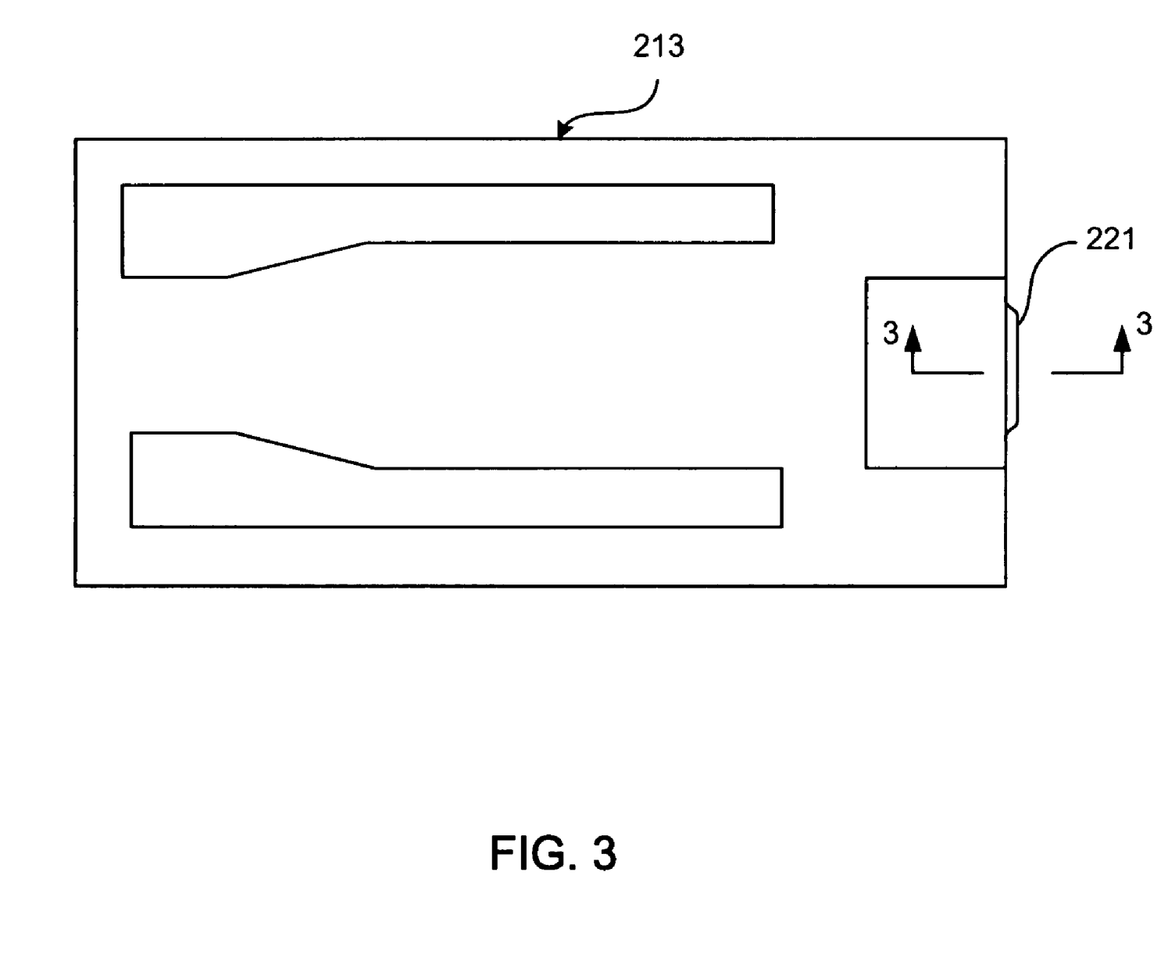
FIG. 3 is an ABS view of a slider, taken from line 3-3 of FIG. 2, illustrating the location of a magnetic head thereon.

With reference to FIG. 3, the orientation of the magnetic head 221 in a slider 213 can be seen in more detail. FIG. 3 is an ABS view of the slider 213, and as can be seen the magnetic head including an inductive write head and a read sensor, is located at a trailing edge of the slider. The above description of a typical magnetic disk storage system, and the accompanying illustration of FIG. 2 are for representation purposes only. It should be apparent that disk storage systems may contain a large number of disks and actuators, and each actuator may support a number of sliders.

Figure 4:
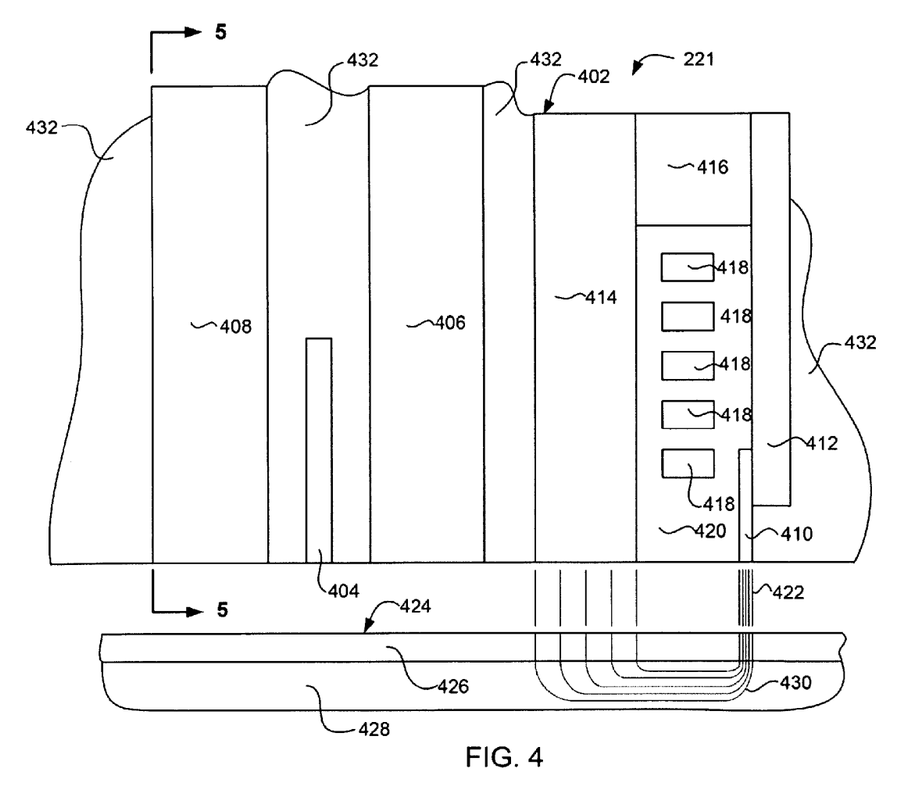
FIG. 4 is an ABS view, taken from line 4-4 of FIG. 3 and rotated 180 degrees, of a magnetic head according to an embodiment of the present invention.

With reference now to FIG. 4, the magnetic head 221 for use in a perpendicular magnetic recording system is described. The head 221 includes a write element 402 and a read sensor 404. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 404 could be another type of sensor such as a current in plane (CIP) GMR sensor or, a tunnel junction sensor (TMR) or some other type of sensor. The sensor 404 is located between and insulated from first and second magnetic shields 406, 408. The magnetic shields, which can be constructed of for example CoFe or NiFe, absorb magnetic fields, such as those from uptrack or down track data signals, ensuring that the read sensor 404 only detects the desired data track located between the shields 406, 408.

With continued reference to FIG. 4, the write element 402 includes a write pole 410 that is magnetically connected with a magnetic shaping layer 412. The write pole has a small cross section at the air bearing surface (ABS) and is constructed of a magnetic material having a high saturation moment density such as FeNi or CoFe. The shaping layer 412 is constructed of a magnetic material such as CoFe or NiFe and has a cross section parallel to the ABS surface that is significantly larger than that of the write pole 410.

The write element 402 also has a return pole 414 that preferably has a surface exposed at the ABS surface and has a cross section parallel with the ABS surface that is much larger than that of the write pole 410. The return pole 414 is magnetically connected with the shaping layer 412 by a back gap portion 416. The return pole 414 and back gap 416 can be constructed of, for example, NiFe, CoFe or some other magnetic material.

An electrically conductive write coil 418, shown in cross section in FIG. 4, passes through the write element 402 between the shaping layer 412, and the return pole 414. The write coil 418 is surrounded by an electrically insulating material 420 that electrically insulates the turns of the coil 418 from one another and electrically isolates the coil 418 from the surrounding magnetic structures 410, 412, 416, 414. When a current passes through the coil 418, the resulting magnetic field causes a magnetic flux to flow through the return pole 414, back gap 416, shaping layer 412 and write pole 410. This magnetic flux causes a write field 422 to be emitted toward an adjacent magnetic medium 424. As described in the background of the invention, the magnetic medium preferably includes a thin magnetically hard top layer 426 and a magnetically softer underlayer 428. The strong, highly concentrated magnetic field from the write pole 410 magnetizes, (ie. fixes the magnetic moment of) the magnetically hard top layer 426, and the resulting magnetic flux 420 travels through the soft underlayer 428. The flux travels to the return pole 414 where it passes back through the magnetically hard top layer 426 toward the return pole 414. As the magnetic flux 430 passes through the top layer 426 to the return pole 414, it is sufficiently spread out and week so as not to affect the magnetization of the magnetically hard top layer 424.

With continued reference to FIG. 4, the areas surrounding the write element 402, shields 406, 408 and the magnetoresistive read element are filled with a non-magnetic, electrically insulating material 432, such as for example alumina ($Al_2O_3$). This insulating material 432 can be formed in multiple layers.

Figure 5:
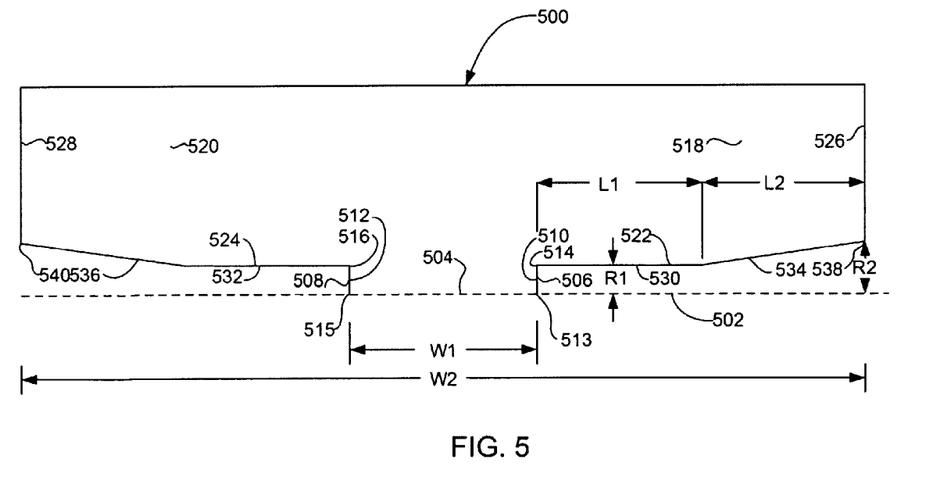
FIG. 5 is a view, taken from line 5-5 of FIG. 4, shown enlarged, of a magnetic structure according to a possible embodiment of the invention.

With reference now to FIG. 5, a magnetic structure 500 having improved resistance to stray field writing is described. The magnetic structure can be for example a magnetic shield 406, 408 (FIG. 4), magnetic return pole 414 (FIG. 5) or any other necessary magnetic structure that might be present in a magnetic head 221 having an air bearing surface (ABS) indicated by dashed line 502. The problem of stray field writing is particularly acute with regard to magnetic shields, since they are by their nature designed to absorb magnetic fields from their surroundings. Therefore, for purposes of clarity the magnetic structure will be described in terms of a magnetic shield 500, although it should be understood that the magnetic structure could be any magnetic structure.

As discussed above in the background of the invention, environmental magnetic fields, which can be caused by many different sources such as airport security equipment, cellular phones, etc., result in magnetic flux which flows through the shield 500. The flow of magnetic flux through a magnetic structure is strongly affected by the geometry such of a structure. Lines of flux become greatly concentrated at abrupt features, especially corners of a magnetic structure. Prior art magnetic shields, which have had sharp corners located near the ABS have exhibited strong concentration of magnetic flux near the ABS, which has resulted in magnetic fields being emitted from these corners toward a nearby magnetic medium. This has resulted in stray field writing and the complete erasure of magnetic signal from portions of the magnetic medium.

Figure 7:
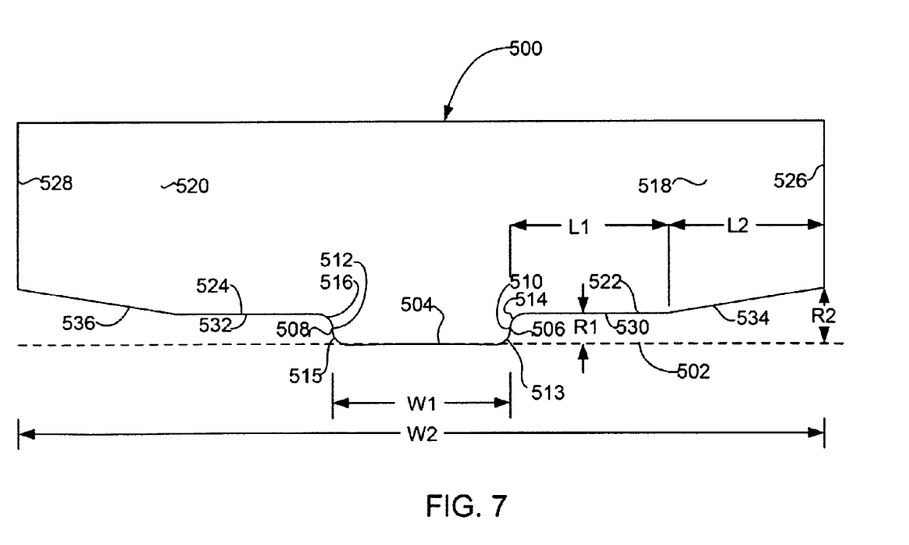
FIG. 7 is a view similar to FIGS. 5 and 6, illustrating another embodiment of the invention.

With continued reference to FIG. 5, the magnetic shield 500 includes a forward extending or forward protruding portion 504, which extends toward the ABS surface 502. The forward protruding portion 504 preferably extends to and is exposed at the ABS surface, but may also be recessed from the ABS by some amount, and also preferably has a flat surface at the ABS 502. The protruding portion 504 is preferably formed at or near the center of the shield 502. First and second notches 506, 508 are formed at either side of the protruding portion and form the lateral sides 510, 512. The distance between the sides 510, 512 defines the width (W1) of the protruding portions 504. The notches 506, 508 are preferably recessed 0.6-0.9 micrometers (um) or about 0.75 um into the head 221 as measured from the ABS, terminating at inner corners 514, 516, which may be sharp (as shown in FIG. 5) or rounded (as shown in FIG. 7). The notches 506, 508 also form outer corners 513, 515, which also may be sharp (as shown in FIG. 5) or rounded (as shown in FIG. 7).

The shield 500 also includes first and second wing portions 518, 520 that extend laterally outward from the region of the forward extending portion 504. Each wing portion 518, 520 has a front edge 522, 524 that extends from the inner corner 514, 516 of each notch 506, 508 to an outer end 526, 528 of each wing 518, 520. As can be seen from FIG. 5, the front edges 522, 524 of the wing portions 518, 520 each have an inner portion 530, 532 that has a front edge with a substantially constant amount of recess from the ABS 502. Each wing portion 518, 520 also has an outer tapered portion 534, 536, each having tapered front edge that has an amount of recess that increases with increasing distance laterally outward from the center of the shield 500.

The junction of each tapered outer portion 534, 536 with its respective constant recess inner portion 530, 532 forms an oblique angle at the front edge of each wing 518, 520. The taper of the outer portions 534, 536 also results in the shield 500 having outermost corners 538, 540 of each wing 518, 520 nearest the ABS that also form oblique angles. The forward protruding portion has a lateral width W1, and the shield 500 has an overall lateral width W2 that is measured between the outer most ends of each of the wings 518, 520. Preferably the W1/W2 is 0.25 to 0.5.

With continued reference to FIG. 5, the constant cross section inner portion of each wing can extend a distance L1 from the forward protruding portion 504 (ie. from the respective side 510, 512 of the forward protruding portion). Each wing portion 518, 520 can extend a distance L2 from the forward protruding portion 504. Preferably the distance L2 can be about 50-100 percent of L1. The constant cross section portions 530, 532 each have an amount of recess (R1) from the ABS 502, which as mentioned above is preferably 0.6-0.9 um or about 0.75 um. The tapered outer portions 534, 536 of the wings 518, 520 each have a recess that increases with increasing distance from the center of the shield 500, resulting in a maximum amount of recess (R2) at outer edges of the wings 518, 520 that is preferably 2 to 4 times R1, or about 3 times R1. In addition, the length of the inner, constant recess portion can be about 10 to 20 times the recess R1.

With reference still to FIG. 5, the forward protruding portion 504 of the shield 500 can be considered to be the functional portion of the shield 500. It should be kept in mind that, as mentioned above, although the structure 500 is being described in terms of a shield, it may be some other structure within a magnetic head. For example, if the structure 500 functions as a shield for a magnetoresistive sensor, the protruding portion 504 will be the portion located adjacent to the magnetoresistive sensor, and will, therefore, be the portion of the shield 500 primarily serves to shield the sensor from unwanted magnetic fields. On the other hand, if the structure 500 were, for example a magnetic pole, such as a return pole of a write element, then the forward protruding portion would be the portion of the structure 500 that primarily serves to conduct magnetic field from the medium, and therefore serves, in a sense, as the functional portion of the return pole.

Whatever the function of the structure 500, it is important that the forward protruding portion 504 not become magnetically saturated. A structure 500 according to the present invention, provides an optimal balance between avoiding saturation of the functional portion (forward protruding portions) 504, while also preventing stray field writing. By forming the notches 506, 508 stray field writing is prevented, by moving the wing portions 518, 520 away from the ABS. The notches 506, 508 should be sufficiently recessed to prevent stray field writing, but should not be so deep as to cause a concentration of magnetic flux at the corners 513, 515 at the sides of the forward protruding portion 504. In addition, the inner portions 530, 532 of the wings 518, 520 should not become magnetically saturated. For these reasons, a desired constant recess R1 is maintained for the inner portions 530, 532 of the wings. As mentioned above, this minimum recess is preferably 0.6-0.9 um or about 0.75 um. Maintaining the constant recess R1 in the inner portions 530, 520 of the wings advantageously prevents magnetic saturation by ensuring sufficient magnetic material is available in the region. The inner portions avoid saturation, while also preventing stray field writing in this region. To further prevent stray field writing, the corners 513, 515 of the forward protruding portion can be rounded rather than sharp.

Although the recess R1 of the inner portions 530, 532 of the wings 518, 520 prevents stray field writing in this region, if this constant amount of recess were to be maintained all the way to the ends 526, 528 of the wings 518, 520, there would be a significant chance that stray field writing would occur at the outer corners of wings 518, 520 nearest the ABS. To alleviate this risk, the outer tapered portions 534, 536 of the wings gradually move the front edge of the wings 518, 520 away from the ABS. This prevents stray field writing from occurring at the outer corners by moving the outer corners of the wings 518, 520 away from the ABS. However, this gradual taper also provides the advantage that the transition from the constant recess inner portions 530, 536 to the outer tapered portions 534, 532 forms a shallow oblique angle, which avoids creating a flux concentration at this junction. If there were to be a sharp angle at this junction, such as a step, there would be the chance that the sharp angle could create its own flux concentration and would result in undesirable stray field writing at this point. The tapered recess of the outer portions 534, 536 provides the further advantage that the corners at the outer edge of the wings 526, 528 form an oblique angle that further reduces flux concentration at this corner compared with a sharper 90 degree angle.

Therefore, it can be seen that the magnetic structure design 500 described above advantageously prevents any undesirable stray field related writing. The design also advantageously provides an efficient flow of magnetic flux to the functional, forward protruding portion 504 of the structure 500, preventing saturation of the inner portions 530, 532 of the wings and avoiding saturation of the forward protruding portion 504.

Figure 6:
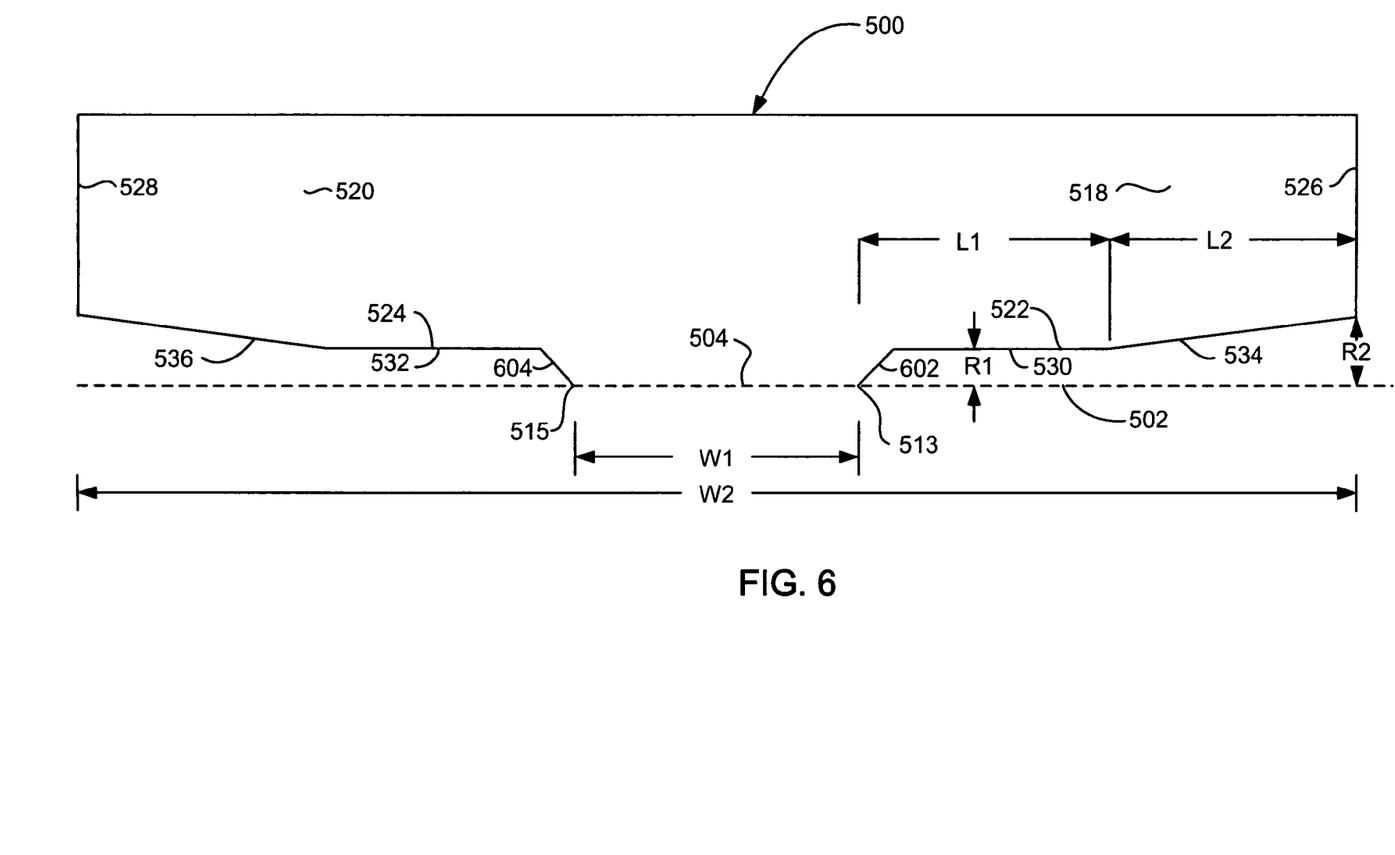
FIG. 6 is a view, similar to that of FIG. 5, illustrating an alternate embodiment of the invention.

With reference now to FIG. 6, in an alternate embodiment of the invention, the forward protruding portion 504 can be configured with beveled sides 602, 604, that may form an angle of 30-45 degrees with respect to the ABS. The beveled, or angled, sides 602, 604 prevent voids from forming in the alumina layer that fills the space between the recessed portions 530, 534 and the ABS 502. Such voids could otherwise become accumulation points for the collection of debris, which could compromise performance and reliability of a write head. The beveled sides provide the added benefit of further preventing stray field writing by reducing flux concentration at the sides of the forward protruding portion.

While various embodiments have been described above, it should be understood that they have been presented by way of example only, and not limitation. Other embodiments falling within the scope of the invention may also become apparent to those skilled in the art. For example although the invention has been described as being incorporated into a perpendicular recording system and would be particularly suited to use in such a system, the invention may be practiced in any magnetic recording system including a longitudinal magnetic recording system. Thus, the breadth and scope of the invention should not be limited by any of the above-described exemplary embodiments, but should be defined only in accordance with the following claims and their equivalents.

What is claimed is:

1. A magnetic shield structure for use in a magnetic recording head having an air bearing surface (ABS), the magnetic shield structure comprising:
    a centrally disposed, forward protruding portion extending toward the ABS and terminating at first and second laterally opposed sides that are perpendicular to the ABS; and
    first and second laterally extending wing portions, extending laterally outward from the first and second sides of the centrally disposed, forward protruding portion;
    the first and second wing portions each having an inner portion and an outer portion, the inner portion of each wing portion being disposed between the outer portion of the wing portion and the centrally disposed, forward protruding portion of the structure;
    the inner portion of each wing portion having a front edge disposed toward the ABS that is parallel with and recessed from the ABS by a substantially constant recess distance;
    the outer portion of each wing portion having a tapered front edge disposed toward the ABS that is recessed from the ABS by a recess distance that increases at a constant rate with increasing distance from the center of the structure;
    wherein the outer portion of each wing portion meets the inner portion of the wing portion at a smooth, non-stepped junction, and wherein the outer portion of each wing portion extends from the junction to an outermost end of the wing portion, the outermost end of the wing portion being perpendicular to the ABS, and wherein the magnetic structure including the centrally disposed forward protruding portion and inner and outer wing portions are disposed in a common plane;
    wherein the distance between the first and second sides of the central, forward protruding portion defines a first width W1 and wherein the distance between the outermost ends of the wing portions defines an overall width W2 and wherein W1/W2 is 0.25 to 0.5; and
    wherein the distance between the junction of the inner and the outer portions to the forward protruding portion defines an inner wing portion length (L1), the inner portion is recessed by a distance R1, and L1 is 10 to 20 times R1.

2. A magnetic shield structure as in claim 1 wherein the front edge of the inner portion of each of the wing portions is recessed from the ABS by a recess distance of 0.6-0.9 um.

3. A magnetic shield structure as in claim 1 wherein the front edge of the inner portion of each of the wing portions is recessed from the ABS by a recess distance of about 0.75 um.

4. A magnetic shield structure as in claim 1, wherein the outer portion of each wing portion has a maximum amount of recess at an outer end that is 2 to 4 times the amount of recess of the inner portion.

5. A magnetic shield structure as in claim 1 wherein the outer portion of each wing portion has a maximum amount of recess at an outer end that is about 3 times the amount of recess of the inner portion.

6. A magnetic shield structure as in claim 1 wherein the magnetic structure comprises NiFe.

7. A magnetic shield structure as in claim 1 wherein the central, forward protruding portion of the structure extends to the ABS.

8. A magnetic shield structure as in claim 1 wherein the inner, constant recessed distance of each wing portion extends a distance L1 from the central, forward protruding portion, and each wing portion extends a distance L2 from the central, forward protruding portion to the outermost end of the respective wing portion, and wherein L1 is 50 to 100 percent of L2.

9. A magnetic shield structure as in claim 1 wherein the central forward protruding portion terminates at first and second laterally opposed sides and forms a rounded corner at the first and second laterally opposed sides.

10. A magnetic shield structure as in claim 1, wherein the inner portion of each wing portion is disposed between the outer portion of the respective wing portion and the central, forward protruding portion of the structure.

* * * * *